(12) United States Patent
Wassell et al.

(10) Patent No.: US 8,734,744 B2
(45) Date of Patent: May 27, 2014

(54) SEPARATION OF GASES

(75) Inventors: David F. Wassell, Belfast (GB); Kenneth R. Seddon, Belfast (GB); Martin P. Atkins, Belfast (GB)

(73) Assignee: Petroliam Nasional Berhad (MY)

(*) Notice: Subject to any disclaimer, the term of this patent is extended or adjusted under 35 U.S.C. 154(b) by 0 days.

(21) Appl. No.: 13/616,577

(22) Filed: Sep. 14, 2012

(65) Prior Publication Data
US 2013/0071309 A1 Mar. 21, 2013

(51) Int. Cl.
*B01D 53/62* (2006.01)

(52) U.S. Cl.
USPC ........... 423/220; 423/223; 423/226; 423/228; 423/234; 95/183; 95/236; 48/127.3; 48/127.5; 422/120; 252/184

(58) Field of Classification Search
USPC ........... 423/220, 223, 226, 228, 234; 95/183, 95/236; 48/127.3, 127.5; 422/120; 252/184
See application file for complete search history.

(56) References Cited

U.S. PATENT DOCUMENTS

| | | | |
|---|---|---|---|
| 2006/0188423 A1* | 8/2006 | Cadours et al. | 423/220 |
| 2011/0076214 A1* | 3/2011 | Yu et al. | 423/228 |
| 2011/0137048 A1 | 6/2011 | Foo | |
| 2011/0214566 A1 | 9/2011 | Lee | |
| 2012/0063978 A1* | 3/2012 | Baugh et al. | 423/228 |
| 2012/0134905 A1* | 5/2012 | Kalb | 423/220 |

FOREIGN PATENT DOCUMENTS

| | | |
|---|---|---|
| EP | 2243539 | 10/2010 |
| GB | 2418926 | 4/2006 |
| WO | 2007101397 | 9/2007 |
| WO | 2010116165 | 10/2010 |
| WO | 2011011830 | 2/2011 |
| WO | 2011114168 | 9/2011 |

OTHER PUBLICATIONS

Jessica L. Anderson, "Solubility of CO2, CH4, C2H6, C2H4, O2, and N2 in 1 Hexyl-3-methylpyridinium Bis(trifluoromethylsulfonyl)imide: Comparison to Other Ionic Liquids", Accounts of Chemical Research, 2007, p. 1208-1216, vol. 40, No. 11, American Chemical Society.

Varinder K. Aggarwal, "Unexpected side reactions of imidazolium-based ionic liquids in the base-catalysed Baylis-Hillman reaction", Chem. Comm., 2002, p. 1612-1613, The Royal Society of Chemistry.

Eleanor D. Bates, "CO2 Capture by a Task-Specific Ionic Liquid", J. Am. Chem. Soc., 2002, p. 926-927, vol. 124, No. 6, American Chemical Society.

Pedro J. Carvalho, "Specific Solvation Interactions of CO2 on Acetate and Triflouroacetate Imidazolium Based Ionic Liquids at High Pressures", J. Phys. Chem. B, 2009, p. 6803-6812, vol. 113, No. 19, American Chemical Society.

A. Yokozeki, "Physical and Chemical Absorptions of Carbon Dioxide in Room-Temperature Ionic Liquids", J. Phys. Chem. B, 2008, p. 16654-16663, vol. 112, No. 51, American Chemical Society.

* cited by examiner

*Primary Examiner* — Timothy Vanoy
(74) *Attorney, Agent, or Firm* — Ryan T. Grace; Advent, LLP

(57) ABSTRACT

Aspects of the disclosure relate to the separation of gases and to a process for the removal of carbon dioxide gas using liquid absorbents. A process is disclosed for removing carbon dioxide from a gaseous stream comprising contacting the gaseous stream with a carbon dioxide absorbent comprising a mixture of an ionic liquid and water in a molar ratio of from 10:1 to 1:10, wherein the ionic liquid has the formula: [Cat+][X−].

30 Claims, 2 Drawing Sheets

SEPARATION OF GASES

CROSS-REFERENCE TO RELATED APPLICATIONS

The present application claims the benefit under 35 U.S.C. §119(b) of UK Patent Application No. 1116062.9, filed Sep. 16, 2011, and titled "SEPARATION OF GASES." UK Patent Application No. 1116062.9 is herein incorporated by reference in its entirety.

BACKGROUND

The separation of carbon dioxide from gas streams is an active field of research due to the increasing concern about global warming from the greenhouse effect and the common belief that the build-up of carbon dioxide in the atmosphere is a contributing factor.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure relate to the separation of gases and to a process for the removal of carbon dioxide gas using liquid absorbents.

DRAWINGS

DETAILED DESCRIPTION

Figure 1:
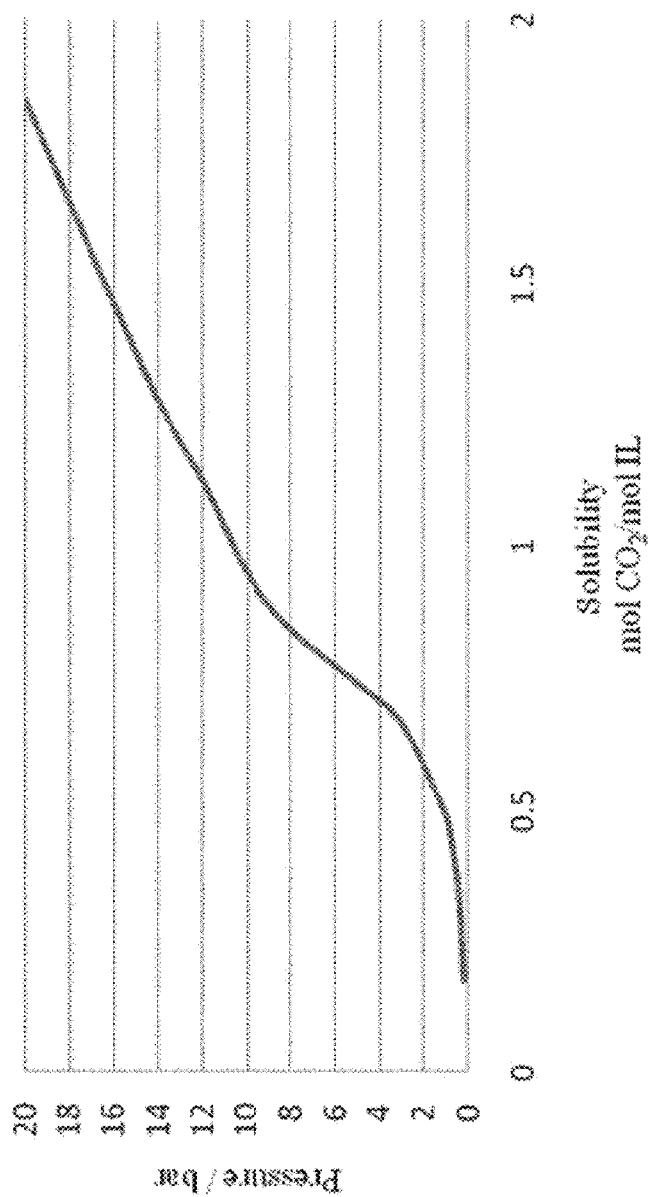
FIG. 1 is an example graph showing the $CO_2$ uptake of the carbon dioxide absorbents.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. The following detailed description is, therefore, not to be taken in a limiting sense.

The separation of carbon dioxide from gas streams is an extremely active field of research, due to the increasing concern about global warming from the greenhouse effect, and the common belief that the build-up of carbon dioxide in the atmosphere is a contributing factor.

In the field of natural gas processing, separation of carbon dioxide and other acidic (sour) gases from the natural gas stream is also of importance to improve the fuel quality and to avoid corrosion problems in metal pipelines.

Separation of carbon dioxide is also important in the field of biogas. Biogas is the product of microbial degradation of organic waste. Biogas streams contain large amounts of carbon dioxide (and other acid gases) and water vapour, in addition to the methane and light hydrocarbons of interest. Hence, removal of carbon dioxide to improve the quality of biogas is necessary as for natural gas.

Carbon dioxide removal processes are of importance in the field of life support systems. For human-occupied sealed systems containing a breathing gas mixture, such as submarines and SCBA gear as well as underground mining shelters and spacecraft, the build-up of metabolites such as carbon dioxide and water vapour must be removed to maintain life. Current technologies rely on carbon dioxide scrubbers (typically a solid material such as lithium hydroxide or zeolites) as well as a separate dehumidifier (see for example BioPak 240). As is the case for natural gas and biogas treatment, the process may be simplified by combing the two procedures in one step.

For all of these reasons and others, the implementation of carbon dioxide separation processes in industry has gained significantly in importance over the last few decades.

The technologies used for the purpose of carbon dioxide separation can be divided into three groups: liquid absorbents, solid absorbents or adsorbents, and membranes. Liquid absorbents are by far the most commonly used of these, and can in turn be divided into physical and chemical absorbents.

In the field of natural gas processing, chemical absorbents are often preferred, since they generally have higher absorption capacities for carbon dioxide. The energy efficiency of chemical absorption processes is determined largely by the energy demands of regenerating the absorbent by desorption of the carbon dioxide.

The most commonly used chemical absorbents for carbon dioxide removal include aqueous amine solutions, chilled ammonia and hot aqueous potassium carbonate. However, these require high temperatures to be recycled, in general far above 100° C. In addition, the high basicity and solvent strength of these systems often leads to other problems such as corrosion of pipelines and other steel parts in the plant. Another drawback of these liquid chemical absorption systems, in particular the aqueous amine systems, is that the amines are volatile and toxic and thus can contaminate the gas stream with loss of absorbent, and also represent a hazard in the workplace. With hot aqueous potassium carbonate absorbents, the major drawbacks include high operating temperatures and the tendency of the salts to crystallize/precipitate during processing. Dilution of the solutions so as to minimize corrosion or crystallization/precipitation issues entails a consequent reduction in carbon dioxide absorption capacity.

Ionic liquids are a class of compounds which have been the subject of intense research over the past few decades. The term "ionic liquid" as used herein refers to a liquid that is capable of being produced by melting a solid, and when so produced consists solely of ions. The term "ionic liquid" includes both compounds having high melting temperature and compounds having low melting points, e.g. at or below room temperature (i.e. 15 to 30° C.). The latter are often referred to as "room temperature ionic liquids" and are often derived from organic salts having pyridinium- and imidazolium-based cations. A feature of ionic liquids is that they have particularly low (essentially zero) vapour pressures. Many organic ionic liquids have low melting points, for example, less than 100° C., particularly less than 80° C., and around room temperature, e.g. 15 to 30° C., and some have melting points well below 0° C.

An ionic liquid may be formed from a homogeneous substance comprising one species of cation and one species of anion, or it can be composed of more than one species of cation and/or anion. Thus, an ionic liquid may be composed of more than one species of cation and one species of anion. An ionic liquid may further be composed of one species of cation, and more than one species of anion.

Ionic liquids generally exhibit a set of useful physico-chemical characteristics that typically include extremely low vapour pressure, wide liquid range, non-degradability, non-flammability, good thermal stability and excellent ability to solubilise a large range of compounds. Due to the potential for controlling these properties of ionic liquids by judicious choice of the constituent ions, and the large variety of ions that can be combined to form low-melting salts, ionic liquids have been proposed for a broad range of applications.

Ionic liquids have been proposed as an alternative to chemical and physical acid gas absorbents for a number of reasons including: (i) the possibility of controlling their properties by the selection of the cation and anion components; (ii) the limited tendency of ionic liquids to crystallize under operating conditions; and (iii) the potential to prevent contamination of the gaseous streams by the absorbent due to the negligible vapour pressure of ionic liquids.

Anderson et al. (Accounts of Chemical Research, 2007, volume 40, pages 1208 to 1216) have reviewed the absorption of a number of different gases in pyridinium, imidazolium and ammonium ionic liquids. The molar enthalpies ($\Delta H$) of gas dissolution were determined for the group of gases tested, and the low values observed indicate that only physical absorption takes place. In particular, carbon dioxide is said to interact with the ionic liquids by means of dispersion, dipole/induced dipole interactions and electrostatic effects.

The use of ionic liquids as chemical $CO_2$ absorbers has also been reported. Bates et al. (Journal of the American Chemical Society, 2002, volume 124, pages 926 to 927) have reported the use of a basic imidazolium ionic liquid having an amine functionality tethered to the imidazolium cation to sequester carbon dioxide as a carbamate. However, the high viscosity of these ionic liquids both before, and especially after, carbon dioxide sequestration is a serious limitation for their potential use in industrial processes.

Carvalho et al. (Journal of Physical Chemistry B, 2009, volume 113, pages 6803 to 6812) have reported the use of 1-butyl-3-methylimidazolium ionic liquids having acetate and trifluoroacetate anions as absorbents for carbon dioxide. This document teaches that purifying the ionic liquid by removal of water prior to use is essential to avoid a reduction in carbon dioxide absorbing capacity which is reported to take place when water is present in the ionic liquid. A number of prior art documents are cited by Carvalho et al., each of which support the deleterious effect of using wet ionic liquids for carbon dioxide absorption.

The absorption of carbon dioxide by ionic liquids containing imidazolium cations is also disclosed by Shiflett et al. (Journal of Physical Chemistry B, 2008, volume 112, pages 16654 to 16663). Again, the ionic liquids are purified by removing water under vacuum with heating for a period of 5 days, emphasizing the need for the ionic liquids to be dry. A single phosphonium ionic liquid (tetra-n-butylphosphonium formate) was also analysed, again in the absence of water, and shown to absorb modest amounts of carbon dioxide by a physical absorption mechanism.

The present inventors have found, however, that the use of imidazolium ionic liquids in industrial processes is seriously limited by the instability of these ionic liquids to many of the components found in natural gas streams. Reaction of imidazolium ions with components of the gaseous stream can lead to loss of absorbent, and contamination of the remaining absorbent with degradation products of the ionic liquid. The instability of imidazolium ionic liquids has been discussed in detail by Aggarwal, V. K. et. al. (Chemical Communications 2002, 1612-1613) and Earle, M. J. at the ACS symposium Washington D.C. 2001 (Abstracts of Papers of the American Chemical Society, 2001, volume 221, 161). There is therefore a need in the art for alternative ionic liquid absorbents that are both capable of absorbing useful quantities of carbon dioxide from gaseous streams, while also being resistant to degradation during processing.

The present disclosure is based on the surprising discovery that, contrary to the teaching in the art to rigorously dry ionic liquids that are used to absorb carbon dioxide, selected classes of ionic liquids demonstrate a marked improvement in carbon dioxide absorption capacity in the presence of water. More specifically, it has surprisingly been found that mixtures of water and ionic liquids having anions that are conjugate bases of acids having a pKa of at least 3.60, in fact demonstrate a marked improvement in carbon dioxide absorption capacity when compared to the ionic liquid alone in the absence of water.

In addition, it has been found that the selected ionic liquids are extremely stable to the processing conditions used for separation of carbon dioxide from gaseous streams, and are highly resistant to degradation by other contaminants that may be present in the gaseous streams.

It has also been found that mixtures of the selected classes of ionic liquids and water are also highly effective in removing other substances, such as water vapour, from gaseous streams. The mixtures of ionic liquids and water may therefore be used in processes for the combined removal of carbon dioxide and one or more additional substances, such as water, from gaseous streams.

Furthermore, it has been found that carbon dioxide and other substances can be easily desorbed from the mixtures of ionic liquids and water. For instance, carbon dioxide can be desorbed by heating in the presence of a sparging gas (e.g. nitrogen gas), or by pressure reduction, allowing the mixtures to be recycled to the separation process without loss or degradation of the absorbent mixture.

According to the present disclosure, there is provided a process for removing carbon dioxide from a gaseous stream comprising contacting the gaseous stream with a carbon dioxide absorbent comprising a mixture of an ionic liquid and water in a molar ratio of from 10:1 to 1:10, wherein the ionic liquid has the formula:

wherein: $[Cat^+]$ represents one or more cationic species selected from tetrasubstituted phosphonium cations, tetrasubstituted ammonium cations, trisubstituted sulfonium cations, guanidinium cations and quinolinium cations; and $[X^-]$ represents one or more anionic species selected from conjugate bases of acids having a pKa of at least 3.6, with the proviso that $[X^-]$ is not formate, acetate, trifluoroacetate, hydroxyacetate, propanoate, pentafluoro-propanoate, lactate, butanoate, isobutanoate, pivalate, pyruvate, thiolactate, oxalate, tartrate, malonate, succinate, adipate or benzoate.

Preferably, $[Cat^+]$ is selected from tetrasubstituted phosphonium cations, tetrasubstituted ammonium cations, and trisubstituted sulfonium cations having the formulae:

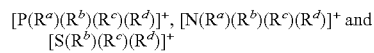

wherein $R^a$, $R^b$, $R^c$, and $R^d$ are each independently selected from a $C_1$ to $C_{20}$ straight chain or branched alkyl group, a $C_3$ to $C_8$ cycloalkyl group, or a $C_6$ to $C_{10}$ aryl group, or wherein any two of $R^a$, $R^b$, $R^c$, and $R^d$ may together form a saturated methylene chain of the formula $-(CH_2)_q-$, where q is an integer of from 4 to 7, or an oxyalkylene chain of the formula $-(CH_2)_2-O-(CH_2)_2-$, wherein said alkyl, cycloalkyl or aryl groups, said methylene chain, or said oxyalkylene chain are unsubstituted or may be substituted by one to three groups selected from: $C_1$ to $C_6$ alkoxy, $C_2$ to $C_{12}$ alkoxyalkoxy, $C_6$ to $C_{10}$ aryl, —CN, —OH, —NO$_2$, —CO$_2$($C_1$ to $C_6$)alkyl, —OC(O) ($C_1$ to $C_6$)alkyl, $C_7$ to $C_{30}$ aralkyl $C_7$ to $C_{30}$ alkaryl, and —N(R$^z$)$_2$, where each R$^z$ is independently selected from hydrogen, methyl, ethyl, n-propyl and iso-propyl, and wherein R$^b$ may also be hydrogen.

More preferably, [Cat$^+$] is selected from tetrasubstituted phosphonium cations and tetrasubstituted ammonium cations having the formulae:

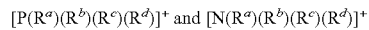
[P(R$^a$)(R$^b$)(R$^c$)(R$^d$)]$^+$ and [N(R$^a$)(R$^b$)(R$^c$)(R$^d$)]$^+$ wherein: R$^a$, R$^b$, R$^c$, and R$^d$ as defined above.

Still more preferably, [Cat$^+$] is selected from tetrasubstituted phosphonium cations having the formula:

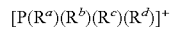
[P(R$^a$)(R$^b$)(R$^c$)(R$^d$)]$^+$ wherein: R$^a$, R$^b$, R$^c$, and R$^d$ as defined above.

In the tetrasubstituted phosphonium cations, tetrasubstituted ammonium cations, trisubstituted sulfonium cations defined above, R$^a$, R$^b$, R$^c$, and R$^d$ (where present) are preferably each independently selected from a $C_1$ to $C_{16}$ straight chain or branched alkyl group, or any two of R$^a$, R$^b$, R$^c$, and R$^d$ may together form a methylene chain of the formula —(CH$_2$)$_q$—, where q is an integer of from 4 or 5.

More preferably, R$^a$, R$^b$, R$^c$, and R$^d$ (where present) are preferably each independently selected from a $C_1$ to $C_{16}$ straight chain or branched alkyl group. Examples of preferred alkyl groups include: methyl, ethyl, n-propyl, n-butyl, n-pentyl, n-hexyl, n-heptyl, n-octyl, n-nonyl, n-decyl, n-undecyl, n-dodecyl, n-tridecyl, and n-tetradecyl.

Still more preferably, R$^a$, R$^b$ and R$^c$, (where present) are preferably each independently selected from a $C_1$ to $C_8$ straight chain or branched alkyl group, and still more preferably a $C_1$ to $C_4$ straight chain or branched alkyl group, and R$^d$ is preferably a $C_1$ to $C_{16}$ straight chain or branched alkyl group, and still more preferably a $C_1$ to $C_8$ straight chain or branched alkyl group.

Still more preferably, R$^a$, R$^b$ and R$^c$, (where present) are each the same $C_1$ to $C_8$ straight chain or branched alkyl group and most preferably the same $C_1$ to $C_4$ straight chain or branched alkyl group, and R$^d$ is preferably a $C_1$ to $C_{16}$ straight chain or branched alkyl group, and most preferably a $C_1$ to $C_8$ straight chain or branched alkyl group.

Preferably, R$^d$ is different from each of R$^a$, R$^b$ and R$^c$.

In a further preferred embodiment, two of R$^a$, R$^b$, R$^c$, and R$^d$ (where present) taken together form a saturated methylene chain of the formula —(CH$_2$)$_q$—, where q is an integer of from 4 to 7, or an oxyalkylene chain of the formula —(CH$_2$)$_2$—O—(CH$_2$)$_2$—. Preferably, q is an integer of 4 or 5.

Examples of preferred tetrasubstituted phosphonium cations and tetrasubstituted ammonium cations and trisubstituted sulfonium cations in accordance with the present invention, include those where R$^a$, R$^b$ and R$^c$ (where present) are each the same alkyl group selected from ethyl, n-butyl and n-hexyl, and where R$^d$ is selected from methyl, ethyl, n-butyl, n-hexyl, n-octyl, n-decyl, n-dodecyl, and n-tetradecyl.

In embodiments, the tetrasubstituted phosphonium cations and tetrasubstituted ammonium cations used in accordance with the present invention are non-symmetrical. As used herein, the term non-symmetrical means that at least one of R$^a$, R$^b$, R$^c$, and R$^d$ is different from each of the other three of R$^a$, R$^b$, R$^c$, and R$^d$. For example, preferred non-symmetrical cations include those in which R$^d$ is different from each of R$^a$, R$^b$, and R$^c$, wherein R$^a$, R$^b$, and R$^c$ may be the same or different.

Specific examples of phosphonium cations that may be used in accordance with the present invention include n-butyl-triethylphosphonium, n-hexyl-triethylphosphonium, n-octyl-triethylphosphonium, tetra-n-butylphosphonium, n-hexyl-tri-n-butylphosphonium, n-octyl-tri-n-butylphosphonium, n-decyl-tri-n-butylphosphonium, n-dodecyl-tri-n-butylphosphonium, n-octyl-tri-n-hexylphosphonium, n-decyl-tri-n-hexylphosphonium, n-dodecyl-tri-n-hexylphosphonium, and n-tetradecyl-tri-n-hexylphosphonium.

Particularly preferred phosphonium cations include tetra-n-butylphosphonium and n-octyl-tri-n-butylphosphonium.

Specific examples of ammonium cations that may be used in accordance with the present invention include tetraethylammonium, n-butyl-triethylammonium, n-hexyl-triethylammonium, n-octyl-triethylammonium, methyl-tri-n-butylammonium, tetra-n-butylammonium, n-hexyl-tri-n-butylammonium, n-octyl-tri-n-butylammonium, n-decyl-tri-n-butylammonium, n-dodecyl-tri-n-butylammonium, n-octyl-tri-n-hexylammonium, n-decyl-tri-n-hexylammonium, n-dodecyl-tri-n-hexylammonium, n-tetradecyl-tri-n-hexylammonium, choline.

Particularly preferred ammonium cations include tetraethylammonium and methyl-tri-n-butylammonium.

Further examples of cyclic ammonium cations include those wherein two of R$^a$, R$^b$, R$^c$, and R$^d$ (where present) taken together form a saturated methylene chain of the formula —(CH$_2$)$_4$— (pyrrolidinium), or of the formula —(CH$_2$)$_5$— (piperidinium), or an oxyalkylene chain of the formula —(CH$_2$)$_2$—O—(CH$_2$)$_2$— (morpholinium), and wherein the other two of R$^a$, R$^b$, R$^c$, and R$^d$ (where present) are as defined above.

Where, [Cat$^+$] is a quinolinium cation, it preferably has the formula:

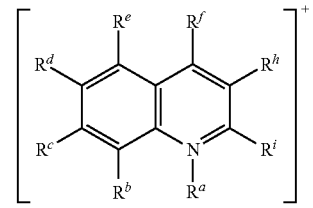

wherein: R$^a$, R$^b$, R$^c$, R$^d$, R$^e$, R$^f$, R$^g$, R$^h$ and R$^i$ are each independently selected from hydrogen, a $C_1$ to $C_{20}$ straight chain or branched alkyl group, a $C_3$ to $C_8$ cycloalkyl group, or a $C_6$ to $C_{10}$ aryl group, or any two of R$^h$, R$^c$, R$^d$, R$^e$, R$^f$, R$^h$ and R$^i$ attached to adjacent carbon atoms may form a saturated methylene chain —(CH$_2$)$_q$— wherein q is from 3 to 6, and wherein said alkyl, cycloalkyl or aryl groups, or said methylene chain are unsubstituted or may be substituted by one to three groups selected from: $C_1$ to $C_6$ alkoxy, $C_2$ to $C_{12}$ alkoxyalkoxy, $C_6$ to $C_{10}$ aryl, —CN, —OH, —NO$_2$, —CO$_2$($C_1$ to $C_6$)alkyl, —OC(O)($C_1$ to $C_6$)alkyl, $C_7$ to $C_{30}$ aralkyl $C_7$ to $C_{30}$ alkaryl, and —N(R$^z$)$_2$, where each R$^z$ is independently selected from hydrogen, methyl, ethyl, n-propyl and iso-propyl.

In the above quinolinium cations, R$^a$ is preferably selected from $C_1$ to $C_{20}$ linear or branched alkyl, more preferably $C_2$ to $C_{20}$ linear or branched alkyl, still more preferably $C_2$ to $C_{16}$ linear or branched alkyl, and most preferably $C_4$ to $C_{10}$ linear or branched alkyl. Examples of suitable $R^a$ groups include ethyl, butyl, hexyl, octyl, nonyl, decyl, undecyl, dodecyl, tridecyl, tetradecyl, pentadecyl, hexadecyl, heptadecyl and octadecyl.

In the above quinolinium cations, $R^b$, $R^c$, $R^d$, $R^e$, $R^f$, $R^h$ and $R^i$ are preferably independently selected from hydrogen and $C_1$ to $C_5$ linear or branched alkyl, and more preferably $R^b$, $R^c$, $R^d$, $R^e$, and $R^f$ are hydrogen.

Examples of preferred quinolinium and cations which may be used in accordance with the present invention include: N—($C_8$-$C_{18}$)alkyl-quinolinium, and N—($C_8$-$C_{18}$)alkyl-6-methylquinolinium.

Where, [Cat$^+$] is a guanidinium cation, it preferably has the formula:

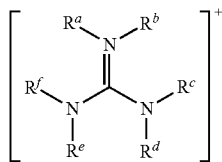

wherein: $R^a$, $R^b$, $R^c$, $R^d$, $R^e$, and $R^f$ are each independently selected from a $C_1$ to $C_{20}$ straight chain or branched alkyl group, a $C_3$ to $C_8$ cycloalkyl group, or a $C_6$ to $C_{10}$ aryl group, or any two of $R^b$, $R^c$, $R^d$, $R^e$, $R^f$, $R^h$ and $R^i$ attached to adjacent carbon atoms may form a saturated methylene chain —(CH$_2$)$_q$— wherein q is from 3 to 6, and wherein said alkyl, cycloalkyl or aryl groups, or said methylene chain are unsubstituted or may be substituted by one to three groups selected from: $C_1$ to $C_6$ alkoxy, $C_2$ to $C_{12}$ alkoxyalkoxy, $C_6$ to $C_{10}$ aryl, —CN, —OH, —NO$_2$, —CO$_2$($C_1$ to $C_6$)alkyl, —OC(O)($C_1$ to $C_6$)alkyl, $C_7$ to $C_{30}$ aralkyl $C_7$ to $C_{30}$ alkaryl, and —N($R^z$)$_2$, where each $R^z$ is independently selected from hydrogen, methyl, ethyl, n-propyl and iso-propyl.

In the above guanidium cations, $R^a$ is preferably selected from $C_1$ to $C_{20}$ linear or branched alkyl, more preferably $C_2$ to $C_{20}$ linear or branched alkyl, still more preferably $C_2$ to $C_{16}$ linear or branched alkyl, and most preferably $C_4$ to $C_{10}$ linear or branched alkyl. Examples of suitable $R^a$ groups include ethyl, butyl, hexyl, octyl, nonyl, decyl, undecyl, dodecyl, tridecyl, tetradecyl, pentadecyl, hexadecyl, heptadecyl and octadecyl.

In the above guanidinium cations, $R^b$, $R^c$, $R^d$, $R^e$ and $R^f$ are preferably selected from $C_1$ to $C_{10}$ linear or branched alkyl, more preferably, $C_1$ to $C_5$ linear or branched alkyl, and most preferably $R^b$, $R^c$, $R^d$, $R^e$ and $R^f$ are each a methyl group.

As noted above, [X$^-$] represents an anionic species which is a conjugate base of an acid having a pKa of 3.6 or more. More preferably, [X$^-$] represents an anionic species which is a conjugate base of an acid having a pKa of 4.0 or more, still more preferably 5.0 or more, still more preferably 6.0 or more, and most preferably 7.0 or more.

Still more preferably, [X$^-$] represents an anionic species which is a conjugate base of an acid having a pKa of 15.0 or less, more preferably 14.0 or less, more preferably 13.0 or less, still more preferably 12.0 or less, still more preferably 11.0 or less and most preferably 10.0 or less.

In accordance with the present disclosure, [X$^-$] may represent an anionic species which may be a monoanion or a dianion.

In an embodiment, [X$^-$] is selected from phosphate dianions and phosphonate dianions.

More preferably, [X$^-$] is selected from phosphate anions having the formula [$R^X$OP(O)O$_2$]$^{2-}$ and phosphonate anions having the formula [$R^x$P(O)O$_2$]$^{2-}$, wherein $R^x$ is selected from hydrogen, a $C_1$ to $C_{10}$ straight chain or branched alkyl group, a $C_3$ to $C_8$ cycloalkyl group, a $C_6$ to $C_{10}$ aryl group, a $C_6$ to $C_{14}$ aralkyl group, or a $C_6$ to $C_{14}$ alkaryl group, wherein said alkyl, cycloalkyl, aryl, aralkyl, or alkaryl groups are unsubstituted or may be substituted by one or more groups selected from —F, —Cl, —Br, —I, —OH, —CN, —NO$_2$, —SH, and =O.

More preferably, $R^x$ is selected from hydrogen or a $C_1$ to $C_{10}$ straight chain or branched alkyl group, wherein said alkyl group is optionally substituted by one or more groups selected from —F, —Cl, —Br, —I, and —OH.

Still more preferably, $R^x$ is selected from hydrogen or a $C_1$ to $C_5$ straight chain or branched alkyl group, wherein said alkyl group is optionally substituted by one or more groups selected from —F, —Cl, —Br, —I, and —OH.

Examples of suitable $R^x$ groups include hydrogen, methyl, ethyl, n-propyl, n-butyl, n-pentyl, n-hexyl, n-heptyl, n-octyl, fluoromethyl, chloromethyl, bromomethyl, iodomethyl, and hydroxymethyl.

Preferably, [X$^-$] is selected from phosphate anions having the formula [$R^X$OP(O)O$_2$]$^{2-}$, wherein $R^x$ is as defined above.

Examples of particularly preferred phosphate anions include [HOP(O)O$_2$]$^{2-}$, [MeOP(O)O$_2$]$^{2-}$, [EtOP(O)O$_2$]$^{2-}$, [n-PrOP(O)O$_2$]$^{2-}$, and [N-BuOP(O)O$_2$]$^{2-}$.

Still more preferably, [X$^-$] is [HOP(O)O$_2$]$^{2-}$ (also referred to herein as [HPO$_4$]$^{2-}$ or hydrogen phosphate).

In a further embodiment, [X$^-$] is selected from dicarboxylate dianions having the formula [O$_2$C—$R^y$—CO$_2$]$^{2-}$, wherein $R^y$ represents a $C_2$ to $C_6$ straight chain or branched alkylene or alkenylene chain, a $C_1$ to $C_6$ cycloalkylene group, or a $C_6$ arylene group, wherein said alkylene, alkenylene, cycloalkylene or arylene groups are unsubstituted or may be substituted with one or more groups selected from —F, —Cl, —Br, —I, —OH, —CN, —NO$_2$, —NH$_2$, —SH, —CO$_2$H, and =O, with the proviso that [X$^-$] is not malonate, succinate or adipate.

Preferably said alkylene, alkenylene, cycloalkylene or arylene groups are unsubstituted or substituted with one or more groups selected from —OH, and —SH.

More preferably, [X$^-$] may be one or more dicarboxylate dianions selected from glutarate dianion, pimelate dianion, methylmalonate dianion, fumarate dianion, maleate dianion, methyl succinate dianion, malate dianion, citrate dianion, itaconate dianion, mesaconate dianion, o-phthalate dianion, m-phthalate dianion, p-pthalate dianion, aspartate dianion, glutamate dianion, octanedioic acid dianion, and heptanedioic acid dianion.

Still more preferably, [X$^-$] may be one or more dicarboxylate dianions selected from glutarate dianion, pimelate dianion, methylmalonate dianion, fumarate dianion, maleate dianion, methyl succinate dianion, malate dianion, itaconate dianion, and mesaconate dianion.

In a further embodiment, [X$^-$] may be selected from ascorbate anion and urate anion.

In a further embodiment, [X$^-$] may be selected from heptanedioic acid monoanion and octanedioic acid monoanion.

In a further embodiment, the present invention provides a process as defined above, with the proviso that [X$^-$] does not comprise a conjugate base of a monocarboxylic acid.

In a further embodiment, the present invention provides a process as defined above, with the proviso that [X$^-$] does not comprise a conjugate base of a carboxylic acid.

According to a further aspect, there is provided a process for removing carbon dioxide from a gaseous stream comprising contacting the gaseous stream with a carbon dioxide absorbent comprising a mixture of an ionic liquid and water in a molar ratio of from 10:1 to 1:10, wherein the ionic liquid has the formula:

wherein: [Cat$^+$] represents one or more cationic species selected from tetrasubstituted phosphonium cations, tetrasubstituted ammonium cations, trisubstituted sulfonium cations, guanidinium cations and quinolinium cations; and

[X$^-$] represents one or more anionic species selected from conjugate bases of acids having a pKa of at least 3.6 and selected from oxalate dianion, tartrate dianion, malonate dianion, succinate dianion, and adipate dianion.

In accordance with this aspect, [Cat$^+$] is preferably as defined above.

According to a further aspect, there is provided a process for removing carbon dioxide from a gaseous stream comprising contacting the gaseous stream with a carbon dioxide absorbent comprising a mixture of an ionic liquid and water in a molar ratio of from 10:1 to 1:10, wherein the ionic liquid has the formula:

wherein: [Cat$^+$] represents one or more cationic species selected from tetrasubstituted phosphonium cations, tetrasubstituted ammonium cations, trisubstituted sulfonium cations, guanidinium cations and quinolinium cations; and

[X$^-$] represents one or more anionic species selected from conjugate bases of acids having a pKa of at least 3.6 and selected from oxalate monoanion, tartrate monoanion, malonate monoanion, succinate monoanion, and adipate monoanion.

In accordance with this aspect, [Cat$^+$] is preferably as defined above.

In view of the foregoing disclosure, it will be appreciated that it is not limited to ionic liquids comprising cations and anions having only a single charge. Thus, the formula [Cat$^+$][X$^-$] is intended to encompass ionic liquids comprising, for example, doubly, triply and quadruply charged cations and/or anions. The relative stoichiometric amounts of [Cat$^+$] and [X$^-$] in the ionic liquid are therefore not fixed, but can vary to take account of cations and anions with multiple charges. For example, the formula [Cat$^+$][X$^-$] should be understood to include ionic liquid species having the formulae [Cat$^+$]$_2$[X$^{2-}$]; [Cat$^{2+}$][X$^-$]$_2$; [Cat$^{2+}$][X$^{2-}$]; [Cat$^+$]$_3$[X$^{3-}$]; [Cat$^{3+}$][X$^-$]$_3$ and so on.

The ionic liquids used in accordance with the above aspects preferably have a melting point of 200° C. or less, more preferably 150° C. or less, and most preferably 100° C. or less. However, ionic liquids with melting points falling outside this range may also be used, provided that the mixture of an ionic liquid and water is liquid at the operating temperature of the process.

Thus, in a preferred embodiments of the invention, the mixture of an ionic liquid and water has a melting point of 100° C. or less, more preferably 80° C. or less, more preferably 50° C. or less, still more preferably 30° C. or less, and most preferably 25° C. or less.

The molar ratio of ionic liquid to water is preferably in the range of from 5:1 to 1:10, more preferably in the range of from 2:1 to 1:10, more preferably in the range of from 1:1 to 1:10, still more preferably in the range of from 1:1 to 1:8, still more preferably in the range of from 1:1 to 1:7, and most preferably in the range of from 1:1 to 1:6. For example, in preferred embodiments of the invention, the molar ratio of ionic liquid to water may be 1:1, 1:2, 1:3, 1:4, 1:5, 1:6, 1:7, 1:8, 1:9 or 1:10.

The gaseous stream is preferably contacted with the carbon dioxide absorbent at a temperature of from 10 to 80° C., more preferably from 10 to 50° C. and most preferably from 20 to 30° C. For example, the gaseous stream may be contacted with the carbon dioxide absorbent at a temperature at or around 25° C.

The gaseous stream is preferably contacted with the carbon dioxide absorbent at a pressure of from 100 to 5000 kPa, more preferably from 100 to 2000 kPa, and most preferably from 200 to 1000 kPa. For example, the gaseous stream may be contacted with the carbon dioxide absorbent at a pressure at or around 500 kPa.

The processes of the present disclosure may be used to remove carbon dioxide, and optionally one or more additional substances, from a number of different types of gaseous streams. For example, the process may be used to remove carbon dioxide from flue gases. As used herein, the term "flue gas" refers to the exhaust gas from a combustion process, such as the exhaust gases from furnaces, internal combustion engines and power plants. Flue gases generally comprise carbon dioxide and water, along with other components such as carbon monoxide, nitrogen, nitrogen oxides, and uncombusted fuel components.

The processes may also be used to remove carbon dioxide, and optionally one or more additional substances, from hydrocarbon-containing gaseous streams. As used herein, the term "hydrocarbon-containing gaseous stream" refers to a gas containing at least 50 volume percent hydrocarbons, more preferably at least 60 volume percent hydrocarbons, more preferably at least 70 volume percent hydrocarbons, still more preferably at least 80 volume percent hydrocarbons, still more preferably at least 90 volume percent hydrocarbons, and most preferably at least 95 volume percent hydrocarbons. In addition to carbon dioxide, hydrocarbon-containing gaseous streams may contain other gaseous components such as carbon monoxide, nitrogen and water vapour.

In particular, the processes may be used to remove carbon dioxide, and optionally one or more additional substances, from hydrocarbon-containing gaseous streams wherein at least 50 volume percent, more preferably at least 60 volume percent, more preferably at least 70 volume percent, still more preferably at least 80 volume percent, still more preferably at least 90 volume percent, and most preferably at least 95 volume percent of the hydrocarbons are methane. Thus, the process of the invention may advantageously be used from the removal of carbon dioxide, and optionally one or more additional substances, from natural gas and/or biogas.

The processes may advantageously be used for the removal of carbon dioxide from breathing gas mixtures in life support systems.

Without being bound by any particular theory, it is believed that absorption of carbon dioxide by the mixture of ionic liquid and water occurs at least in part by the formation of H$_2$CO$_3$ (carbonic acid) by the dissolution of carbon dioxide in water, followed by an acid/base reaction with the ionic liquid anion. This hypothesis is supported by the observation that ionic liquids containing anions which are conjugate bases of acids having a lower pKa value than carbonic acid (3.60) are not as efficient as absorbers of carbon dioxide. It is believed that these ionic liquids are mainly physical absorbers of carbon dioxide and undergo little, if any, chemical interaction with the absorbed carbon dioxide.

A further advantage of the ionic liquids is that they are capable of both chemical and physical absorption processes.

It has been observed that initial absorption of carbon dioxide by the ionic liquids proceeds by way of chemical absorption. However, once the chemical absorption capacity of the ionic liquid is spent, absorption of carbon dioxide continues via physical processes. This is observed experimentally by a distinct change in slope of a graph of $CO_2$ absorption against $CO_2$ partial pressure.

As noted above, carbon dioxide can be easily desorbed from the mixtures of ionic liquids and water by heating in the presence of a sparging gas (e.g. nitrogen gas), and/or by pressure reduction, allowing the mixtures to be recycled to the separation process without loss or degradation of the absorbent mixture. It has been found that the mixture of ionic liquid and water can be repeatedly recycled to the separation process with little or no decrease in the carbon dioxide absorption capacity of the absorbent.

It will be appreciated that where the ionic liquid/water absorbent is also used to remove water from the gas stream, then it will be necessary to periodically or continuously remove water from the absorbent so as to maintain the water content of the absorbent within the limits indicated above.

Water may be removed from the absorbent for example by drying at 60 to 80° C. under vacuum, by sparging a dry gas at elevated temperature, or by reverse osmosis.

Where the process is operated continuously, a portion of the absorbent is continuously or periodically removed from the process to remove carbon dioxide and, if necessary, water so as to restore the composition of the absorbent. The absorbent is subsequently recycled to the to the carbon dioxide removal process.

In accordance with the processes, a gaseous stream is recovered having reduced content of carbon dioxide, and optionally one or more other substances such as water, when compared to the composition of the gaseous stream fed to the process.

It will be appreciated that the process may be integrated into processing plants as one stage of a multi-stage processing of gaseous streams. For instance, the process of the present invention could be used in a natural gas refinery as one stage in the production of a commercial natural gas product, wherein other stages could include removal of nitrogen and removal of heavy hydrocarbons. Alternatively, the process of the present invention could be used in a flue gas treatment plant as one stage of a multi-stage processing of flue gases, where other stages could for instance include removal of particulates and catalytic conversion of $NO_x$.

In another aspect, the present disclosure provides the use of a mixture of an ionic liquid and water in a molar ratio of from 10:1 to 1:10, wherein the ionic liquid has the formula:

$$[Cat^+][X^-]$$

wherein: $[Cat^+]$ represent one or more cationic species as defined above; and $[X^-]$ represents one or more anionic species selected from conjugate bases of acids having a pKa of at least 3.6, with the proviso that $[X^-]$ is not formate, acetate, trifluoroacetate, hydroxyacetate, propanoate, pentafluoro-propanoate, lactate, butanoate, isobutanoate, pivalate, pyruvate, thiolactate, oxalate, tartrate, malonate, succinate, adipate or benzoate, for the removal of carbon dioxide from a gaseous stream.

In a further aspect, the present disclosure provides the use of a mixture of an ionic liquid and water in a molar ratio of from 10:1 to 1:10, wherein the ionic liquid has the formula:

$$Cat^+][X^-]$$

wherein: $[Cat^+]$ represent one or more cationic species as defined above; and $[X^-]$ represents one or more anionic species selected from conjugate bases of acids having a pKa of at least 3.6, and selected from oxalate dianion, tartrate dianion, malonate dianion, succinate dianion, and adipate dianion, for the removal of carbon dioxide from a gaseous stream.

In a further aspect, the present disclosure provides the use of a mixture of an ionic liquid and water in a molar ratio of from 10:1 to 1:10, wherein the ionic liquid has the formula:

$$[Cat^+][X^-]$$

wherein: $[Cat^+]$ represent one or more cationic species as defined above; and $[X^-]$ represents one or more anionic species selected from conjugate bases of acids having a pKa of at least 3.6, and selected from oxalate monoanion, tartrate monoanion, malonate monoanion, succinate monoanion, and adipate monoanion, for the removal of carbon dioxide from a gaseous stream.

Preferably, said uses are for the removal of carbon dioxide and at least one other substance from a gaseous stream. Most preferably, the at least one other substance is water.

Definitions of the ionic liquid which are said to be preferred in relation to the processes in the foregoing disclosure are also preferred in accordance with the uses.

In accordance with the uses, said gaseous stream may be a hydrocarbon-containing gaseous stream, for example a methane-containing gaseous stream such as a natural gas stream or a biogas-derived stream. Alternatively, said gaseous stream may be a flue gas stream. In a further alternative, said gaseous stream may be a breathing gas stream for a life support system.

The present disclosure will now be described by reference to the following examples, and the attached figures, in which:

FIG. 1 is a representative graph showing the $CO_2$ uptake of the carbon dioxide absorbents of the present invention. Typical chemical absorption behaviour is observed at low $CO_2$ pressure, with the $CO_2$ uptake increasing asymptotically as the 1:1 molar ratio is approached. Once the saturation pressure is reached (i.e. a 1:1 molar ratio of ionic liquid and $CO_2$), the system switches to the linear response expected of a physical $CO_2$ absorber. The linear increase in absorption is observed continuously to the highest $CO_2$ partial pressure observed.

Figure 2:
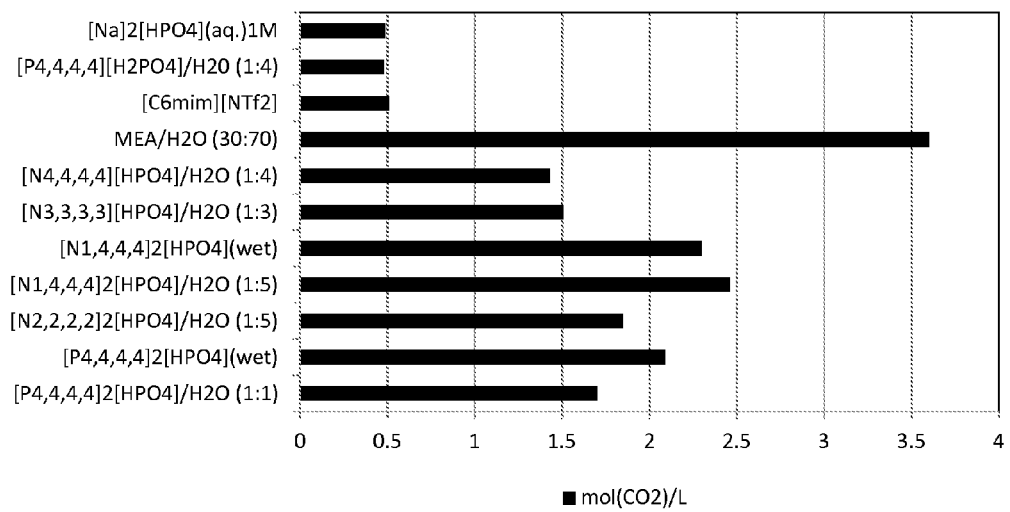
FIG. 2 is a histogram showing a comparison of the $CO_2$ absorption of various $CO_2$ absorbents from Examples 3 to 7.

FIG. 2 is a histogram showing a comparison of the $CO_2$ absorption of various $CO_2$ absorbents from Examples 3 to 7.

EXAMPLES

General

This example describes the general experimental method used to determine the solubility of carbon dioxide in the ionic liquid-water mixtures.

In a typical experiment, the volume of a pressure vessel [Parr pressure system] is first determined by evacuating it under reduced pressure and subsequently pumping a known amount of gas at a certain temperature and pressure into the vessel. Measurement of the amount of gas is read as the volume of gas at standard conditions from the mass flow controller [BROOKS Smart Massflow]. The ideal gas law is used to calculate the actual volume of the pressure vessel.

A known mass and volume of an ionic liquid-water mixture is placed in a pressure vessel and degassed for 5 min under reduced pressure. Carbon dioxide is then pumped into the stirred pressure vessel (1000 rpm) through the mass flow controller up to 500 kPa and at 25.0° C. The system is allowed to equilibrate for 15 min or until no more gas is added according to the mass flow controller.

Calculation of the total amount of gas introduced in the pressure vessel is made using the reading in the mass flow controller. The actual amount of gas in the gas phase is calculated by the ideal gas law, where the volume of the gas phase was equal to the volume of the pressure vessel minus the volume of the liquid phase. The amount of gas dissolved in the liquid phase was calculated by subtracting the actual amount of gas in the gas phase from the total amount of gas introduced into the pressure vessel.

Results are expressed as a molar concentrations by weight (mol($CO_2$)/kg(ionic liquid)) and by volume (mol($CO_2$)/L (ionic liquid)). Ratios of ionic liquid to water are molar ratios. The amount of water in the liquid mixtures was quantified by Karl-Fischer titration, and/or $^1$H NMR.

Example 1 (Comparative Example)

Solubility of Carbon Dioxide in Tributyloctylphosphonium Dibutylphosphate

The solubility of carbon dioxide in ionic liquids containing anions which are conjugate bases of acids having a pKa of less than 3.6 was examined using tributyloctylphosphonium dibutylphosphate ([$P_{4,4,4,8}$][DBP]), which has the following formula:

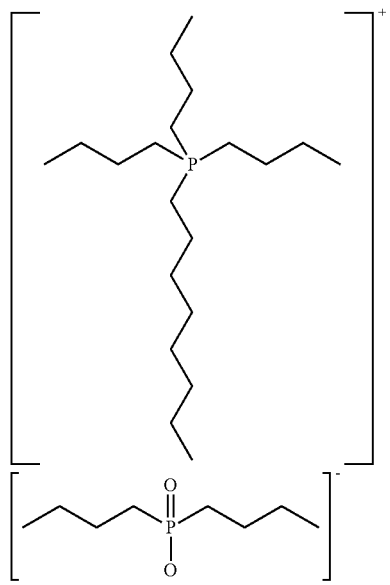

Carbon dioxide absorption by this ionic liquid was examined using both the neat ionic liquid and a 1:1 molar ratio of the ionic liquid and water. The results are shown in Table 1

TABLE 1

| Ionic liquid (IL) | Mass IL (g) | mol($CO_2$)/ L(IL) | mol($CO_2$)/ kg(IL) |
|---|---|---|---|
| [$P_{4,4,4,8}$][DBP] | 6.011 | 0.3337* | 0.3526* |
| [$P_{4,4,4,8}$][DBP]/$H_2O$ (1:1) | 5.477 | 0.4639 | 0.4878 |

*Average over three runs

These results show that the ionic liquid does not dissolve as much $CO_2$ as expected. In particular, the presence of 1 molar equivalent of water only gives rise to a slight increase in the solubility of carbon dioxide in the ionic liquid. It is believed that the acid/base reaction of the ionic liquid with carbonic acid does not take place due to the low pKa of the conjugate acid of the [DBP] anion, (pKa=ca. 1.72).

Example 2 (Comparative Example)

Solubility of Carbon Dioxide in Tetrabutylphosphonium Dihydrogenphosphate

Tetrabutylphosphonium dihydrogenphosphate ([$P_{4,4,4,4}$][$H_2PO_4$]) was produced by titrating tetrabutylphosphonium hydroxide with phosphoric acid to the pH end point of 4.54 with the assistance of a pH meter before removal of water under reduced pressure. The resulting product was a solid at room temperature, but readily liquefied when combined with water at an ionic liquid to water molar ratio of 1:4. Carbon dioxide with this ionic liquid was examined according to the procedure described above, and the results are shown in Table 2.

TABLE 2

| Ionic liquid (IL) | Mass IL (g) | mol($CO_2$)/ L(IL) | mol($CO_2$)/ kg(IL) |
|---|---|---|---|
| [$P_{4,4,4,4}$][$H_2PO_4$] | N/A* | | |
| [$P_{4,4,4,4}$][$H_2PO_4$]/$H_2O$ (1:1) | 5.494 | 0.484 | 0.468 |

*Solid at the operating temperature of the process - absorption could not be measured These results again show that the ionic liquid does not dissolve as much $CO_2$ as expected. It is believed that the acid/base reaction of the ionic liquid with carbonic acid does not take place due to the low pKa of phosphoric acid, (pKa=ca. 2.12).

Example 3

Solubility of Carbon Dioxide in Monohydrogenphosphate Ionic Liquids

The ionic liquids tetrabutylphosphonium hydrogenphosphate ([$P_{4,4,4,4}$]$_2$[$HPO_4$]), tetraethyl-ammonium hydrogenphosphate ([$N_{2,2,2,2}$]$_2$[$HPO_4$]), tributylmethylammonium hydrogen-phosphate ([$N_{1,4,4,4}$]$_2$[$HPO_4$]), tetrapropylammonium hydrogenphosphate ($N_{3,3,3,3}$][$HPO_4$]), and tetrabutylammonium hydrogenphosphate ($N_{4,4,4,4}$][$HPO_4$]) were produced by titration of the corresponding hydroxides with phosphoric acid to a pH end point of 9.28 with the assistance of a pH meter. The ionic liquids were used in two forms: (i) "wet" wherein the ionic liquid was used in the form obtained by drying using a rotary evaporator without the application of vacuum, such that the water content is not precisely defined but is still thought to be present in molar excess relative to the ionic liquid; and (ii) in defined molar ratios of ionic liquid to water, by removing water to dryness under high vacuum and then combining the ionic liquid residue the required volume of water. The results are shown in Table 3.

TABLE 2

| Ionic liquid (IL) | Mass IL (g) | mol($CO_2$)/ L(IL) | mol($CO_2$)/ kg(IL) |
|---|---|---|---|
| [$P_{4,4,4,4}$]$_2$[$HPO_4$]/$H_2O$ (1:1) | 6.943 | 1.804 | 1.808 |
| [$P_{4,4,4,4}$]$_2$[$HPO_4$] (wet) | 6.610 | 2.060 | 2.007 |
| [$N_{2,2,2,2}$]$_2$[$HPO_4$]/$H_2O$ (1:5) | 5.602 | 1.906 | 1.663 |
| [$N_{1,4,4,4}$]$_2$[$HPO_4$]/$H_2O$ (1:5) | 5.393 | 2.459 | 2.393 |
| [$N_{1,4,4,4}$]$_2$[$HPO_4$] (wet) | 8.665 | 2.299 | 2.237 |

TABLE 2-continued

| Ionic liquid (IL) | Mass IL (g) | mol(CO$_2$)/ L(IL) | mol(CO$_2$)/ kg(IL) |
|---|---|---|---|
| [N$_{3,3,3,3}$][HPO$_4$]/H$_2$O (1:3) | | 1.518 | |
| [N$_{4,4,4,4}$][HPO$_4$]/H$_2$O (1:4) | | 1.434 | |

These results demonstrate that the solubility of carbon dioxide in ionic liquid-water mixtures increases remarkably when the ionic liquid anion is the conjugate base of an acid having a pKa above 3.60 (pKa [H$_2$PO$_4$]=7.21).

Example 4 (Comparative Example)

Solubility of Carbon Dioxide in Neat 1-hexyl-3-methylimidazolium bis(trifluoromethane)-sulfonimide ([C$_6$mim][NTf$_2$])

The solubility of carbon dioxide in neat [C$_6$mim][NTf$_2$] was measured at 500 kPa and at 25.0° C. as described in Example 1. This liquid solution was chosen as a comparative example of an ionic liquid CO$_2$ absorber having an anion which is a conjugate base of an acid having a pKa of less than 3.6. The solubility of carbon dioxide in this ionic liquid was 0.52 mol~L$^{-1}$.

Example 5 (Comparative Example)

Solubility of Carbon Dioxide in Tetrabutylphosphonium Dihydrogenphosphate ([P$_{4,4,4,4}$][H$_2$PO$_4$]) and Water The solubility of carbon dioxide in neat [P$_{4,4,4,4}$][H$_2$PO$_4$] and water (1:4 molar ratio) was measured at 500 kPa and at 25.0° C. as described in Example 1. This liquid solution was chosen as a comparative example of an ionic liquid CO$_2$ absorber comprising water and having an anion which is a conjugate base of an acid having a pKa of less than 3.6. The solubility of carbon dioxide in this ionic liquid was 0.484 mol·L$^{-1}$.

Example 6 (Comparative Example)

Solubility of Carbon Dioxide in 1M Aqueous Na$_2$HPO$_4$

The solubility of carbon dioxide in neat [C$_6$mim][NTf$_2$] was measured at 500 kPa and at 25.0° C. as described in Example 1. This liquid solution was chosen as a comparative example of an aqueous CO$_2$ absorber having an anion which is a conjugate base of an acid having a pKa of greater than 3.6, but which has a sodium cation as the counterion instead of an ionic liquid cation. The solubility of carbon dioxide in this ionic liquid was 0.49 mol·L$^{-1}$.

Example 7 (Comparative Example)

Solubility of Carbon Dioxide in Monoethanolamine/water Mixtures

The solubility of carbon dioxide in a mixture of monoethanolamine (MEA) and water (30:70 MEA/H$_2$O weight ratio) was measured at 500 kPa and at 25.0° C. as described in Example 1. This liquid solution was chosen as a comparative example of a carbon dioxide chemical absorber used commercially in industry, especially in natural gas processing operations. The solubility of carbon dioxide in the monoethanolamine/water mixture was found to be 3.57 mol·L$^{-1}$. It will therefore be appreciated that the ionic liquid-water mixtures of the present invention clearly provide viable alternatives to the conventional use of monoethanolamine/water mixtures.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A process for removing carbon dioxide from a gaseous stream comprising contacting the gaseous stream with a carbon dioxide absorbent comprising a mixture of an ionic liquid and water in a molar ratio of from 10:1 to 1:10, wherein the ionic liquid has the formula:

[Cat$^+$][X$^-$]

wherein: [Cat$^+$] represents one or more cationic species selected from tetrasubstituted phosphonium cations, tetrasubstituted ammonium cations, trisubstituted sulfonium cations, guanidinium cations and quinolinium cations; and

[X$^-$] represents one or more anionic species selected from conjugate bases of acids having a pKa of at least 3.6, where the one or more anionic species includes at least one of phosphate dianions, phosponate dianions, or dicarboxylate dianions, with the proviso that [X$^-$] is not formate, acetate, trifluoroacetate, hydroxyacetate, propanoate, pentafluoro-propanoate, lactate, butanoate, isobutanoate, pivalate, pyruvate, thiolactate, oxalate, tartrate, malonate, succinate, adipate or benzoate.

2. A process according to claim 1, wherein [Cat$^+$] is selected from:

[P(R$^a$)(R$^b$)(R$^c$)(R$^d$)]$^+$, [N(R$^a$)(R$^b$)(R$^c$)(R$^d$)]$^+$ and [S(R$^b$)(R$^c$)(R$^d$)]$^+$ wherein R$^a$, R$^b$, R$^c$, and R$^d$ are each independently selected from a C$_1$ to C$_{20}$ straight chain or branched alkyl group, a C$_3$ to C$_8$ cycloalkyl group, or a C$_6$ to C$_{10}$ aryl group, or wherein any two of R$^a$, R$^b$, R$^c$, and R$^d$ may together form a saturated methylene chain of the formula —(CH$_2$)$_q$—, where q is an integer of from 4 to 7, or an oxyalkylene chain of the formula —(CH$_2$)$_2$—O—(CH$_2$)$_2$—, wherein said alkyl, cycloalkyl or aryl groups, said methylene chain, or said oxyalkylene chain are unsubstituted or may be substituted by one to three groups selected from: C$_1$ to C$_6$ alkoxy, C$_2$ to C$_{12}$ alkoxyalkoxy, C$_6$ to C$_{10}$ aryl, —CN, —OH, —NO$_2$, —CO$_2$(C$_1$ to C$_6$)alkyl, —OC(O)(C$_1$ to C$_6$)alkyl, C$_7$ to C$_{30}$ aralkyl, C$_7$ to C$_{30}$ alkaryl, and —N(R$^z$)$_2$, where each R$^z$ is independently selected from hydrogen, methyl, ethyl, n-propyl and iso-propyl, and wherein R$^b$ may also be hydrogen.

3. A process according to claim 2, wherein [Cat$^+$] is selected from:

[P(R$^a$)(R$^b$)(R$^c$)(R$^d$)]$^+$ and [N(R$^a$)(R$^b$)(R$^c$)(R$^d$)]$^+$ wherein: R$^a$, R$^b$, R$^c$, and R$^d$ are as defined in claim 2.

4. A process according to claim 3, wherein [Cat$^+$] is selected from:

[P(R$^a$)(R$^b$)(R$^c$)(R$^d$)]$^+$ wherein: R$^a$, R$^b$, R$^c$, and R$^d$ are as defined in claim 2.

5. A process according claim 2, wherein R$^a$, R$^b$, R$^c$, and R$^d$ are each independently selected, where present, from a C$_1$ to C$_{16}$ straight chain or branched alkyl group, or wherein any two of R$^a$, R$^b$, R$^c$, and R$^d$ together form a methylene chain of the formula —(CH$_2$)$_q$—, where q is an integer of from 4 or 5.

6. A process according to claim 1, wherein [Cat⁺] is selected from quinolinium cations of the formula:

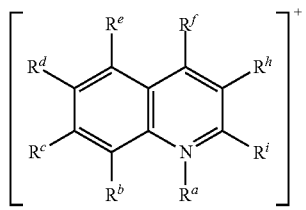

wherein: $R^a$, $R^b$, $R^c$, $R^d$, $R^e$, $R^f$, $R^g$, $R^h$ and $R^i$ are each independently selected from hydrogen, a $C_1$ to $C_{20}$ straight chain or branched alkyl group, a $C_3$ to $C_8$ cycloalkyl group, or a $C_6$ to $C_{10}$ aryl group, or any two of $R^b$, $R^c$, $R^d$, $R^e$, $R^f$, $R^h$ and $R^i$ attached to adjacent carbon atoms may form a saturated methylene chain —$(CH_2)_q$— wherein q is from 3 to 6, and wherein said alkyl, cycloalkyl or aryl groups, or said methylene chain are unsubstituted or may be substituted by one to three groups selected from: $C_1$ to $C_6$ alkoxy, $C_2$ to $C_{12}$ alkoxyalkoxy, $C_6$ to $C_{10}$ aryl, —CN, —OH, —NO₂, —CO₂($C_1$ to $C_6$)alkyl, —OC(O)($C_1$ to $C_6$)alkyl, $C_7$ to $C_{30}$ aralkyl $C_7$ to $C_{30}$ alkaryl, and —N($R^z$)₂, where each $R^z$ is independently selected from hydrogen, methyl, ethyl, n-propyl and iso-propyl.

7. A process according to claim 1, wherein [Cat⁺] is selected from guanidinium cations of the formula:

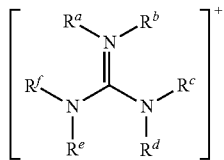

wherein: $R^a$, $R^b$, $R^c$, $R^d$, $R^e$, and $R^f$ are each independently selected from a $C_1$ to $C_{20}$ straight chain or branched alkyl group, a $C_3$ to $C_8$ cycloalkyl group, or a $C_6$ to $C_{10}$ aryl group, or any two of $R^b$, $R^c$, $R^d$, $R^e$, $R^f$, $R^h$ and $R^i$ attached to adjacent carbon atoms may form a saturated methylene chain —$(CH_2)_q$— wherein q is from 3 to 6, and wherein said alkyl, cycloalkyl or aryl groups, or said methylene chain are unsubstituted or may be substituted by one to three groups selected from: $C_1$ to $C_6$ alkoxy, $C_2$ to $C_{12}$ alkoxyalkoxy, $C_6$ to $C_{10}$ aryl, —CN, —OH, —NO₂, —CO₂($C_1$ to $C_6$)alkyl, —OC(O)($C_1$ to $C_6$)alkyl, $C_7$ to $C_{30}$ aralkyl $C_7$ to $C_{30}$ alkaryl, and —N($R^z$)₂, where each $R^z$ is independently selected from hydrogen, methyl, ethyl, n-propyl and iso-propyl.

8. A process according to claim 1, wherein [X⁻] represents an anionic species which is a conjugate base of an acid having a pKa of 4.0 or more.

9. A process according to claim 1, wherein [X⁻] represents an anionic species which is a conjugate base of an acid having a pKa of 15.0 or less.

10. A process according to claim 1, wherein [X⁻] is selected from phosphate anions having the formula [$R^xOP(O)O_2$]²⁻ and phosphonate anions having the formula [$R^xP(O)O_2$]²⁻, wherein $R^x$ is selected from hydrogen, a $C_1$ to $C_{10}$ straight chain or branched alkyl group, a $C_3$ to $C_8$ cycloalkyl group, a $C_6$ to $C_{10}$ aryl group, a $C_6$ to $C_{14}$ aralkyl group, or a $C_6$ to $C_{14}$ alkaryl group, wherein said alkyl, cycloalkyl, aryl, aralkyl, or alkaryl groups are unsubstituted or may be substituted by one or more groups selected from —F, —Cl, —Br, —I, —OH, —CN, —NO₂, —SH, and =O.

11. A process according to claim 10, wherein [X⁻] is selected from phosphate anions having the formula [$R^xOP(O)O_2$]²⁻, where $R^x$ is as defined in claim 10.

12. A process according to claim 10, wherein $R^x$ is selected from hydrogen or a $C_1$ to $C_{10}$ straight chain or branched alkyl group, wherein said alkyl group is optionally substituted by one or more groups selected from —F, —Cl, —Br, —I, and —OH.

13. A process according to claim 12, wherein [X⁻] is [HOP(O)O₂]²⁻.

14. A process according to claim 8, wherein [X⁻] is selected from dicarboxylate dianions having the formula [$O_2C$—$R^y$—$CO_2$]²⁻, wherein $R^y$ represents a $C_2$ to $C_6$ straight chain or branched alkylene or alkenylene chain, a $C_1$ to $C_6$ cycloalkylene group, or a $C_6$ arylene group, wherein said alkylene, alkenylene, cycloalkylene or arylene groups are unsubstituted or may be substituted with one or more groups selected from —F, —Cl, —Br, —I, —OH, —CN, —NO₂, —SH, —CO₂H and =O, with the proviso that [X⁻] is not succinate or adipate dianion.

15. A process according to claim 14, wherein [X⁻] is a dicarboxylate dianion selected from glutarate dianion, pimelate dianion, methylmalonate dianion, fumarate dianion, maleate dianion, methyl succinate dianion, malate dianion, citrate dianion, itaconate dianion, and mesaconate dianion, o-phthalate dianion, m-phthalate dianion, p-pthalate dianion, aspartate dianion, glutamate dianion, octanedioic acid dianion, and heptanedioic acid dianion.

16. A process according to claim 1, with the proviso that [X⁻] does not comprise a conjugate base of a monocarboxylic acid.

17. A process according to claim 1, with the proviso that [X⁻] does not comprise a conjugate base of a carboxylic acid.

18. A process according to claim 1, wherein the ionic liquid has a melting point of 200° C. or less.

19. A process according to claim 1, wherein the mixture of an ionic liquid and water has a melting point of 100° C. or less.

20. A process according to claim 1, wherein the molar ratio of ionic liquid to water is from 5:1 to 1:10.

21. A process according to claim 1, wherein the gaseous stream is contacted with the carbon dioxide absorbent at a temperature of from 10 to 80° C.

22. A process according to claim 1, wherein the gaseous stream is contacted with the carbon dioxide absorbent at a pressure of from 100 to 5000 kPa.

23. A process according to claim 1, wherein carbon dioxide is subsequently released from the carbon dioxide absorbent.

24. A process according to claim 23, wherein the carbon dioxide is subsequently released by subjecting the carbon dioxide absorbent to reduced pressure, or by sparging the carbon dioxide absorbent with a gas at elevated temperature.

25. A process according to claim 1, wherein the gaseous stream is a hydrocarbon-containing gaseous stream.

26. A process according to claim 25, wherein the gaseous stream is a methane-containing gaseous stream.

27. A process according to claim 26, wherein the gaseous stream is a natural gas stream.

28. A process according to claim 26, wherein the gaseous stream is a biogas-derived stream.

29. A process according to claim 1, wherein the gaseous stream is a flue gas stream.

30. A process according to claim 1, wherein [X—] comprises $[HOP(O)O_2]^{2-}$.

* * * * *